(No Model.)

J. SANTMIER.
TREE TRANSPLANTER.

No. 524,404. Patented Aug. 14, 1894.

Witnesses:
Arthur Kemp
Henry C. Ashbery

Inventor.
Jacob Santmier
By James Sangster
Attorney.

UNITED STATES PATENT OFFICE.

JACOB SANTMIER, OF BUFFALO, NEW YORK.

TREE-TRANSPLANTER.

SPECIFICATION forming part of Letters Patent No. 524,404, dated August 14, 1894.

Application filed March 31, 1894. Serial No. 505,973. (No model.)

*To all whom it may concern:*

Be it known that I, JACOB SANTMIER, a citizen of the United States, residing at Buffalo, in the county of Erie and State of New York, have invented certain new and useful Improvements in Tree-Transplanters, of which the following is a specification.

This invention relates to an improved device for lifting, transporting and transplanting trees of large size and will be fully and clearly hereinafter described and claimed, reference being had to the accompanying drawings, in which—

Figure 1:
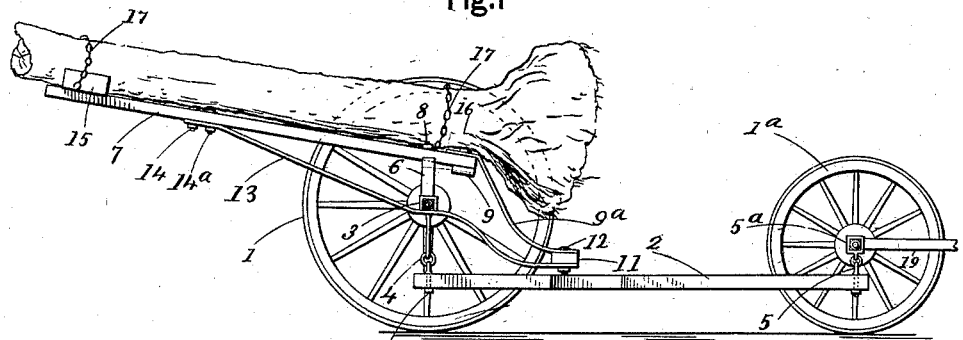
Figure 2:
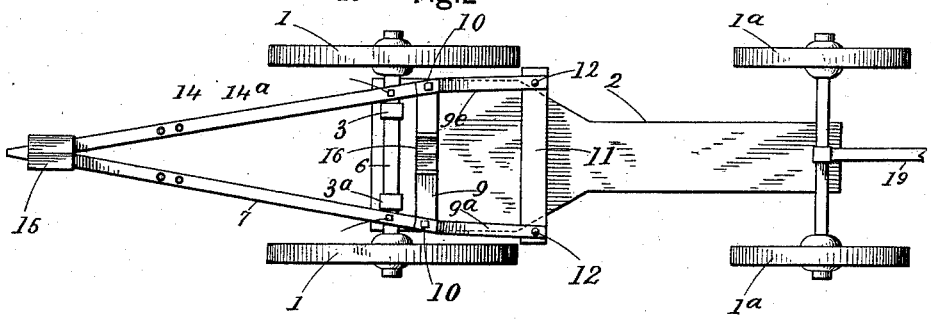
Figure 3:
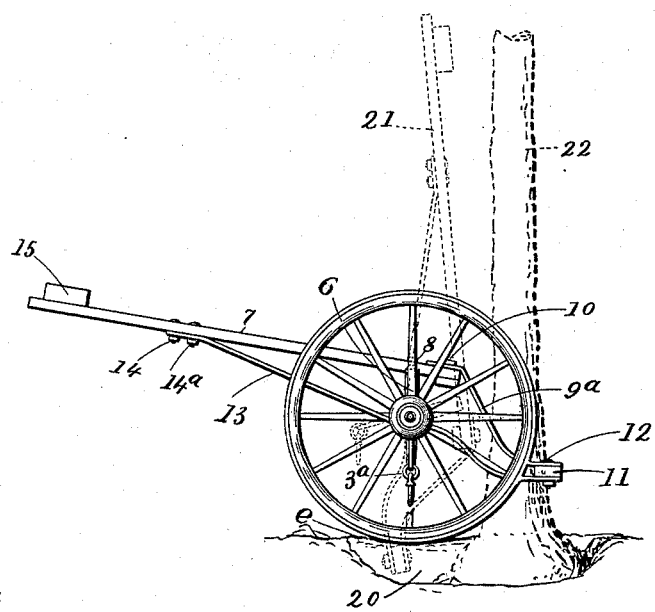

Figure 1 is a side elevation of the wagon and apparatus, showing the manner of carrying a tree for transplanting. Fig. 2 is a top view of the same, the tree being omitted. Fig. 3 represents the tree lifting portion detached from the wagon, showing its position in dotted lines preparatory to receiving and lifting a tree, or for dropping a tree in position for transplanting, the tree being shown in dotted lines.

Referring to the drawings in detail, 1 represents the rear wheels and $1^a$, the front wheels, which are the same as any ordinary wheel.

The platform 2, or what is sometimes technically called the "boat" is made unusually heavy and strong. It is secured to the rear axle by the clevis $3^a$, and 3, and ring-links 4, and at the front is secured to the front axle by the single link and clevis 5 and $5^a$. Mounted on the rear axle and secured in the well known way by bolts is a heavy bed piece 6, and on the bed piece is an angular or V shaped frame 7, made of hard and strong timber, and bolted to the bed piece by bolts 8. At the wide end of the frame 7, is a cross bar 9, securely bolted thereto, and to the frame piece 7 and cross-bar 9, is bolted two iron braces $9^a$ and $9^c$, which extend downward and forward and are bolted to a cross bar 11, by bolts 12, and directly below these two braces are two more iron braces 13, only one of which is shown in Fig. 1, both being exactly alike. These braces 13, are each rigidly secured at their rear ends by bolts 14, and $14^a$, the heads of all being shown in Fig. 2, and they extend forward under the rear axle and then downward and forward to the cross-bar 11, where they are secured by the same bolts 12, that secure the braces $9^a$ and $9^c$.

On the frame is secured two holding blocks 15 and 16, each having a V shaped depression, or they are made concave at the top for the body of the tree to lay in when secured in place by the chains 17, in the usual way.

The frame 7 being rigidly connected to the rear wheels 1, is made easily removable by removing the nuts 18.

The tongue 19, of the wagon is made in the usual way and it is designed for two or more horses, as some of the trees transplanted often weigh over five tons.

The operation of the device is as follows:— The body or tree lifting portion of the wagon consisting of the rear axle and wheels, V shaped frame 7, its supporting braces and cross bar 11, and mechanism for releasing it from the platform 2, being detached as hereinbefore mentioned, is moved to a tree designed to be lifted, an opening being first made in ground around the tree, see Fig. 3, and one side of it is made a depression deep enough to allow the end or bar 11, with its iron braces to dip down into it when the device is turned up in the position shown by the dotted lines 21, in Fig. 3, being brought close to a tree the tree 22, is also shown by dotted lines in Fig. 3, the ground at the points $e$, under the wheels, being left even with the surface or substantially so, so that the wheels 1, will not go down. The tree is then secured to the frame 7, and then turned over to nearly a horizontal position, substantially as shown in Fig. 1. It is then secured to the frame 7, by chains and carried off in the usual way by horses.

The apparatus is separated and operated substantially in the same way in planting a tree, the only difference being that the tree is then turned up to a vertical position, the roots being dropped into a hole adapted to receive it. By this construction, the bar 11, passes down under the roots of the tree and thereby lifts the tree upward without injuring the bark which is a serious objection incident to the lifting of large trees.

I am aware that in a tree transplanter, a removable rear axle and wheels carrying a means for receiving and holding a tree, has heretofore been used. I therefore do not claim such construction broadly, but What I do claim is—

1. In a tree transplanter, the combination with a wagon of a removable rear axle and wheels, a V shaped frame 7, and means for supporting and holding a tree, rigidly connected to the bed piece of the rear axle, a cross-bar 9, forming the wide end of the V shaped frame, braces extending downward and forward from the V shaped frame, and cross bar 11, connected to their lower ends, and a clevis, ring link and screw nut at each side of the axle, for connecting or disconnecting the axle to or from the platform, substantially as described.

2. In a tree transplanter, the combination of a removable rear axle carrying the rear wheels of the wagon, with a V shaped frame 7, and means for receiving and holding a tree, rigidly connected to the bed piece 6, of the axle; a cross bar 9, forming the wide end of the V shaped frame, downwardly and forwardly extending curved bars $9^a$ and $9^e$, connected by a cross-bar 11, braces extending from the cross bar 11, nearly to the small end of the V shaped frame to which they are secured, and screw bolts and nuts at each side of the axle by which the rear truck is connected or disconnected from the platform, substantially as and for the purposes described.

JACOB $\overset{\text{his}}{\underset{\text{mark}}{\times}}$ SANTMIER.

Witnesses:
 JAMES SANGSTER,
 HARRIET JOHNSON.